United States Patent [19]

Nishimi et al.

[11] 4,201,362
[45] May 6, 1980

[54] ELECTROMAGNETIC PILOT TYPE VALVE

[75] Inventors: Ichiro Nishimi, Tokyo; Hideaki Ohira, Tokorozawa, both of Japan

[73] Assignee: Kabushiki Kaisha Saginomiya Seisakusho, Tokyo, Japan

[21] Appl. No.: 921,052

[22] Filed: Jun. 30, 1978

[51] Int. Cl.$^2$ .................. F16K 31/02; F16K 31/102
[52] U.S. Cl. .......................... 251/29; 251/29; 251/44; 251/30
[58] Field of Search ............... 251/29, 30, 44

[56] References Cited

U.S. PATENT DOCUMENTS

| | | | |
|---|---|---|---|
| 1,767,037 | 6/1930 | Anderson | 251/29 |
| 2,758,811 | 8/1956 | Peterson | 251/44 |
| 3,905,575 | 9/1975 | Zeuner et al. | 251/29 |
| 3,954,249 | 5/1976 | Gratzmuller | 251/29 |

Primary Examiner—Martin P. Schwadron
Assistant Examiner—G. L. Walton
Attorney, Agent, or Firm—Lackenbach, Lilling & Siegel

[57] ABSTRACT

An electromagnetic pilot type valve having at least one auxiliary pilot valve disposed and operatively connected between the pilot valve and the main valve. The auxiliary valve is operated in response to the pilot valve to operate the main valve. With this construction a main valve body of a relatively large diameter can be operated with a small electromagnetic pilot valve, so that the whole construction of the valve can be compactly made.

4 Claims, 3 Drawing Figures

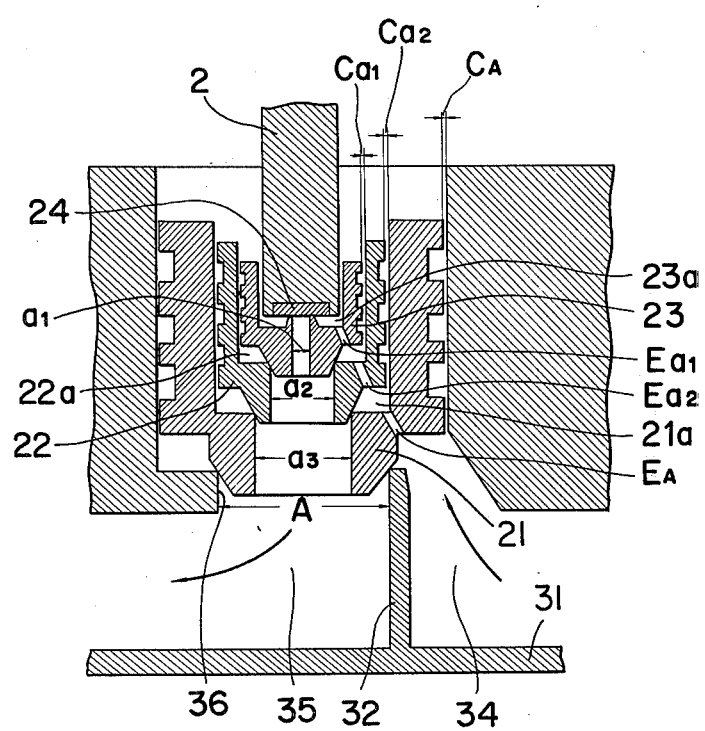

ELECTROMAGNETIC PILOT TYPE VALVE

BACKGROUND OF THE INVENTION

The present invention relates to an electromagnetic pilot type check valve, and more particularly to an electromagnetic pilot type check valve of large diameter.

In a conventional electromagnetic valve of large diameter such as shown in Japanese Utility Model Application Publication No. 47-30980 dated Sept. 18, 1972, a pilot operation system is employed. In a check valve mounted into a supply pipe, in order to open a piston type main valve 1 as shown in FIG. 1, a plunger 2 is attracted by an electromagnetic force to open a pilot port 3 provided in main valve 1 so that a fluid existing above (with respect to the drawing) or in the piston cup 1a of the main valve 1 is discharged from the pilot port 3 into a discharge port 35 provided in the fluid pipe. The fluid in an intake port 34 is introduced to the piston cup 1a of the main valve 1 through a pressure balancing port E provided in the main valve 1 and a gap C between the valve body lands of the main valve 1. Since the cross sectional area of the pilot port 3 is greater than the sum of the pressure balancing port E and gap C, the discharge amount of fluid is greater than intake. Therefore, the pressure in the piston cup 1a of the main valve 1 is lower than that at the intake port 34 and the main piston valve 1 is moved upwardly due to the difference between these pressures so as to open the main valve port 36.

When an electromagnetic coil is turned off, the pilot port 3 is closed by the plunger 2 to allow the fluid to be admitted to the piston cup of the main valve 1 through the pressure balancing port E and gap C. At this time, the pressure in the piston cup 1a of the main valve 1 balances that at the front surface thereof, and a valve port 36 is closed by the weight of the main valve 1 itself.

When the diameter of the main valve port 36 is increased, the diameter of valve seat or main valve 1 is necessarily increased, and the area of the inner surfaces of the valve body lands and main piston 1 which define the gap C is also increased even when the distance between the inner surfaces of the valve body lands and main piston 1 is not changed. When the area of the inner surfaces of the valve body lands and main piston 1 which define the gap C is increased, it is necessary that the cross-sectional area a of the pilot port 3 which serves to cause difference in pressure between the rear and front surfaces of the main piston 1 be greater than the area of the pressure balancing port E and gap C.

The plunger 2 is moved when the electromagnetic force F is greater than $P_1 \times a +$ weight of plunger, wherein $P_1$ represents the difference in pressure between the inlet and outlet for the fluid, so as to open the pilot port 3. As may be clear from the above, the attraction force for opening the pilot port 3 is increased when the cross-sectional area a of the pilot port 3 is increased. In such a case, a coil having a large electromagnetic force is required. Namely, when a main valve having an increased diameter is employed in a conventional electromagnetic pilot valve, a coil having a large electromagnetic force has to be used. Using such a coil is contradictory to the improvement of an electromagnetic pilot valve in which a main valve of a large diameter has to be opened and closed with a coil having a small magnetic force.

SUMMARY OF THE INVENTION

It is an object of the present invention to provide an electromagnetic valve which permits opening and closing the main valve with a coil of a small electromagnetic force irrespective of an increased in diameter of the main valve. It is another object of the present invention to provide an electromagnetic pilot type valve of large diameter in compact construction. The electromagnetic valve according to the present invention has been made by improving the construction of a conventional electromagnetic pilot valve. Namely, the present invention provides a multi-pison type electromagnetic pilot valve comprising a plurality of auxiliary pilot ports provided between a pilot port and a main valve port in a conventional electromagnetic pilot valve, a main piston valve for opening and closing the main valve port, auxiliary piston valves for opening and closing the auxiliary pilot ports, and a plunger for opening and closing the pilot port. A first auxiliary pilot port adjacent to the pilot port is opened and closed while opening and closing the pilot port with the plunger, and a second auxiliary pilot port is opened and closed when the first auxiliary pilot port is opened and closed, the remaining auxiliary pilot ports are thus opened and closed in sequence to finally open and close the piston type main valve.

BRIEF DESCRIPTION OF THE DRAWINGS

Now, the construction of the present invention will be described with reference to the embodiments as shown in the accompanying drawings.

FIG. 3 is a cross-sectional view of another embodiment of the present invention, i.e. a multi-piston type electromagnetic pilot valve having auxiliary pilot ports formed concentrically with the main valve port in vertical succession.

DESCRIPTION OF THE PREFERRED EMBODIMENTS

Figure 1:
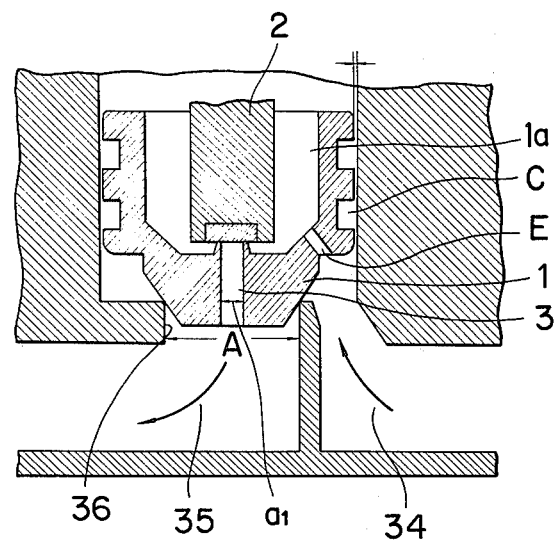
FIG. 1 is a cross-sectional view of a principal portion of a conventional electromagnetic pilot valve.
Figure 2:
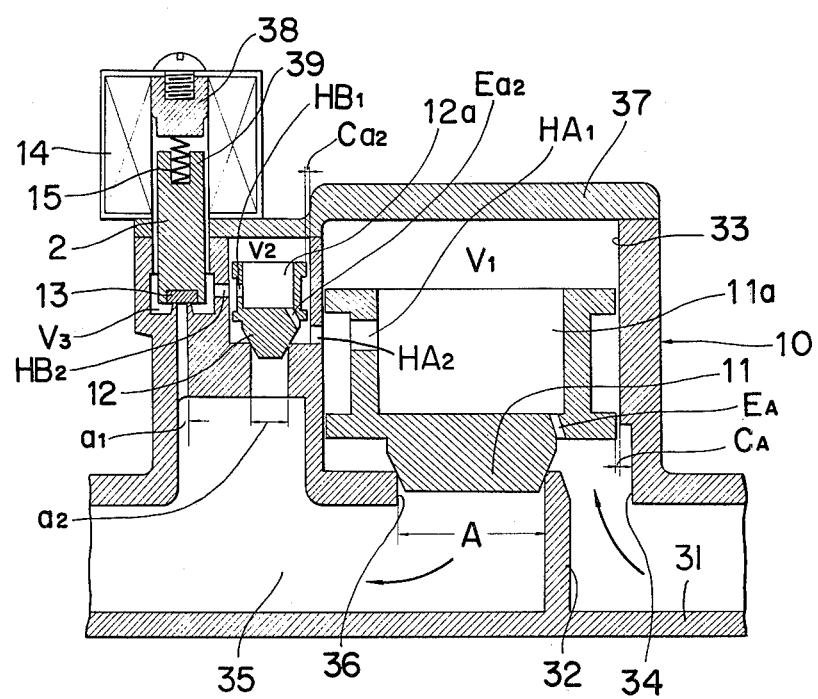
FIG. 2 is a cross-sectional view of one embodiment of the present invention, i.e. a multi-piston type electromagnetic pilot valve having auxiliary pilot ports formed in lateral succession.

FIG. 2 shows a first embodiment of the present invention. In this embodiment, there is provided pilot port $a_1$, auxiliary port $a_2$ and main valve port 36, each communicating with the fluid supply pipe downstream of the discharge port 35, and longitudinally of the fluid conduit connecting the fluid line with their corresponding pressure chamber when viewed on the drawing.

The complete valve assembly is joined to the main fluid supply pipe 31 by a conventional means and is provided with an inspection cover plate 37 for the pressure chambers and piston valves. This embodiment has an auxiliary piston valve which opens and closes the port. Fluid flow is indicated by the arrows from port 34 through the assembly to discharge port 35. The construction of the valve assembly provides a main body 10, having a main valve chamber $V_1$, an auxiliary valve chamber $V_2$ and a plunger chamber $V_3$ adjacent each other and separated by walls of the main assemblies. In the main valve chamber $V_1$, there is a circular free moving piston or valve body 11 which has a valve at its lower part and circular lands around its periphery and a space behind the valve and lands so as to form a piston cup, and there is a gap CA between the lands of the piston and the wall of the body 10.

The main moving pistons or valve body 11 serves to open and close the main valve port 36 provided between a lower partition wall of the main valve chamber $V_1$ and the baffle wall 32 so as to introduce a fluid from the intake port 34 to the discharge port 35 which is separated from the intake port by the baffle wall 32 provided in the supply pipe 31. The main moving piston or valve body 11 is provided with a pressure balancing port EA communicating the intake port 34 at the front side of the main moving piston or valve body with the piston cup 11a. Between the main valve chamber $V_1$ and the auxiliary chamber $V_2$ adjacent thereto, lateral ports HA1 in the main moving piston or valve body 11 and HA2 in the main assembly wall 10 are provided which communicate with the piston cup 11a.

In the main assembly wall 10, the auxiliary valve chamber $V_2$ is at one end closed by an inspection cover plate 37 and at the other end is communicating with the discharge port 35 through an auxiliary port $a_2$. The auxiliary valve chamber $V_2$ is provided with an auxiliary piston valve 12 opening and closing the auxiliary valve port $a_2$ and is provided with a pressure balancing port $Ea_2$ communicating the fluid intake side or front surface of the auxiliary valve 12 and a piston cup 12a in its bore. There is a gap $Ca_2$ formed between the piston surface lands of the auxiliary piston valve 12 and the inner surface of a partition wall of the auxiliary valve chamber $V_2$.

Between the auxiliary valve chamber $V_2$ and plunger chamber $V_3$ adjacent thereto, lateral port $HB_1$ is provided in the wall of the auxiliary piston 12 and another lateral port $HB_2$ is provided in the wall of the main assembly 10 to thereby communicate the plunger chamber $V_3$ with the piston cup 12a. In the main assembly wall 10 between the plunger chamber $V_3$ and discharge port 35 a pilot port $a_1$ is provided, which is opened and closed by a pilot valve 13 formed at the valve end of the plunger 2.

The plunger 2 is a known solenoid means fitted by known means to pass through the inspection cover plate 37 and moved up or down when an electromagnetic coil 14 is energized and de-energized. The sizes of the ports are such that they have the following relation with respect to their cross sections $$EA + CA < a_2 \leq HA_1 = HA_2$$

$$Ea_2 + Ca_2 < a_1 \leq HB_1 = HB_2$$

When an electromagnetic coil 14 is turned off, the plunger 2 is urged by the spring 15 placed between the spring tension adjuster 38 and the plunger head 39 to close the pilot port $a_1$. Fluid is introduced from the intake port 34 into the piston cup 11a of the main piston valve 11 through the pressure balancing port EA and the gap CA. The fluid further flows into the auxiliary valve chamber $V_2$ via the lateral ports $HA_1$, $HA_2$ to introduce fluid into the chamber $V_2$. At this time, the water or fluid level in the piston cup 12a of the auxiliary piston valve is increased since the pilot port $a_1$ is closed. The auxiliary valve chamber $V_2$ is then filled with the fluid expanding from the piston cup 12a so that the pressure at the front surface of the auxiliary piston valve 12 balances that at its rear surface, and the valve 12 is lowered by its own weight to close the auxiliary pilot port $a_2$.

When the auxiliary pilot port $a_2$ which is provided in a wall of the main assembly 10 is closed, the water or fluid flow behind the main piston valve 11 stops and is no longer discharged out of the piston cup 11a. Consequently, the water or fluid level in the piston cup 11a is increased and the main valve chamber $V_1$ is filled with the water or fluid. At this time, the pressure at the front surface of the main piston valve balances that at its rear surface, and the main valve port 36 is closed by the main moving piston or valve body 11 lowered by its own weight. Sequential operation is that after the pilot port $a_1$ has been closed, the auxiliary pilot port $a_2$ is then closed to finally close the main valve port 36. When the pilot port $a_1$ is closed, the other two ports are also closed. When the coil 14 is turned on with the three ports closed, the plunger 2 moves to open the pilot port $a_1$, and the fluid in the plunger chamber $V_3$ is discharged into the discharge port 35 provided in the water or fluid pipe 31. At the same time, the fluid in the piston cup 12a of the auxiliary valve 12 flows into the plunger chamber $V_3$ via the lateral ports $HB_1$, $HB_2$. Since the amount of fluid discharged from the piston cup 12a is greater than that of fluid flowing thereinto via the pressure balancing port $Ea_2$ and gap $Ca_2$, the difference in pressure between the front and rear surfaces of the auxiliary piston 12 causes it to move and open the auxiliary pilot port $a_2$. Then, the fluid in the moving piston or cup 11a of the main piston valve body 11 flows through the lateral ports $HA_1$, $HA_2$ and is discharged from the auxiliary pilot port $a_2$ into the area of the discharge port 35.

Since the amount of fluid discharged from the auxiliary pilot port $a_2$ is greater than that of fluid supplied into the moving piston or cup 11a of the main piston valve body 11 via the pressure balancing port EA and gap CA, there is a pressure difference between the piston cup 11a of the main moving piston or valve body 11 and the intake port 34. This pressure difference causes the main moving piston or valve body 11 to open the main valve port 36, and the fluid flows from the intake port 34 and is discharged into the discharge port 35 via the main valve port 36 with a part of the fluid flowing through the pressure balancing port Ea, lateral ports $HA_1$, $HA_2$ and auxiliary valve chamber $V_2$ into the plunger chamber $V_3$. Thus, the auxiliary pilot port $a_2$ and pilot port $a_1$ are opened and the fluid also flows into the discharge port 35 from these ports.

The Inventors have ascertained through experiments in this embodiment that the described operation is carried out when the cross-sectional areas $a_1'$, $a_2'$ and A of the pilot port $a_1$, auxiliary pilot port $a_2$ and main valve port 36 are in the relation expressed by the following formula.

$$a_2'/a_1' = A/a_{2'} = 4-5 \tag{1}$$

Therefore, the present invention permits opening and closing a main valve port having a cross-sectional area of up to $4 \times 4 = 16(a_1')$ or $5 \times 5 = 25(a_1')$ with respect to the cross-sectional area of the pilot port $a_1$. The present invention further permits opening and closing a main valve port having a cross-sectional area of $4 \times 4 \times 4 = 64(a_1')$ or $5 \times 5 \times 5 = 125(a_1')$ when one more pilot port is used. Namely, the present invention permits opening and closing a main valve of a large diameter with a coil which produces a small electromagnetic force with which the plunger 2 can be attracted and the pilot port $a_1$ can be opened and closed.

FIG. 3 shows another embodiment of the present invention where a series of circular pistons, each piston having port lands and being disposed inside the bore of the next larger size and each piston being free moving under the influence of fluid, the piston motion being initiated by the positioning of the plunger 2. In this embodiment, there is a main valve port 36 formed between a main assembly wall 10 and the top of baffle wall 32, an auxiliary port $a_3$ formed in the bore of the main piston valve 21, another auxiliary port $a_2$ formed in the bore of auxiliary piston valve 22 and a pilot port $a_1$ formed in the bore of auxiliary piston valve 23. In this embodiment, a main moving piston or valve body 21 is for opening and closing the main valve port 36, a second auxiliary piston valve 22 for opening and closing an auxiliary pilot port $a_3$, an auxiliary piston valve 23 for opening and closing the auxiliary pilot port $a_2$, and a pilot valve 24 is provided on a plunger 2 whereby a pilot port $a_1$ is opened or closed, these auxiliary valves 22 and 23 and plunger 2 with the pilot valve 24 being disposed within the main moving piston or valve body 21. This embodiment is provided, in the same manner as the first embodiment, with a pressure balancing port EA communicating a fluid intake port 34 in the front surface of the main moving piston or valve body 21 with a space 21a in the bore of the main piston valve. The space 21a also serves as an intake port for the second piston valve 22. In addition a gap CA is between the lands of the main moving piston or valve body 21 and a wall of the valve body 20. A pressure balancing port $Ea_2$ connects the space or chamber 21a provided in the second auxiliary piston valve 22 with a chamber 22a, a gap $Ca_2$ between the lands of the second piston valve 22 and the bore of the main moving piston or valve body 21. Also a pressure balancing port $Ea_1$ connects the chamber 22a provided in the first auxiliary piston valve with a plunger chamber 23a, and a gap $Ca_1$ between the lands of the piston valve 23 and bore of piston valve 22.

The operation of this embodiment is also identical with that of the first embodiment. Namely, the pilot port $a_1$ is opened by the plunger 2 so as to successively open the auxiliary pilot ports $a_2$, $a_3$ and finally open the main valve port 36. When the pilot port $a_1$ is closed by the plunger 2, the valves are closed in sequence.

Since the main moving piston or valve body 21, second piston valve 22, first piston valve 23 and plunger 2 in this embodiment are concentrically and vertically stacked, lift for each valve is required when the valves are opened. The plunger 2 requires a lift as large as a total lift for the valves. Then, an electromagnetic coil (not shown) having an attraction force large enough is needed to obtain such a lift. When such an electromagnetic coil is employed in this embodiment, the characteristics thereof can be fully displayed since the valves therein are miniaturized so that they can be installed in a small and compact space.

As is understood from the above, the multi-piston type electromagnetic pilot valve according to the present invention is considerably improved as compared with a conventional electromagnetic pilot valve. Moreover, it is unique in that there is provided a plurality of auxiliary the pilot ports between pilot port and the main valve port, and an equal number of auxiliary piston valves for auxiliary pilot ports, as well as a plunger for opening the pilot port, and an electromagnetic coil having a small but sufficient electromagnetic force to attract the plunger. When the electromagnetic coil is excited to attract the plunger, the auxiliary pilot ports are successively opened to finally open the main valve port, the diameter of which is much greater than that of a conventional electromagnetic pilot valve. Thus, the electromagnetic pilot valve according to the present invention as compared with a conventional one serves to widen to a great extent its range of application.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A generally compact multi-piston type electromagnetic pilot valve comprising a single valve housing, a pilot port, a main valve port, at least one auxiliary pilot port provided between said pilot port and said main valve port having diameters progressively smaller than that of said main valve port and gradually increased at a predetermined rate with respect to that of said pilot port, cup-shaped piston valves for opening and closing said main valve port and said at least one auxiliary pilot port, said piston valves including front, rear and inner lower surfaces, first passages for communicating and acting on the front and the inner lower surfaces of said piston valves, second passages being defined by the outer circumference of said piston valves, said second passages communicating and acting on said front, said rear and said inner lower surfaces of said piston valves, and a plunger being provided to open and close said pilot port, a first auxiliary pilot port adjacent to said pilot port being opened and closed by at least one of said auxiliary piston valves while opening and closing said pilot port with said plunger, and said piston valves, said pilot port, said auxiliary pilot port, said main valve port and said plunger are disposed in parallel relationship with each other within said valve housing; whereby a main valve body of a generally large diameter may be operated with a generally small electromagnetic pilot valve.

2. An electromagnetic pilot valve according to claim 1, including an additional auxiliary pilot port being opened and closed by an additional auxiliary cup-shaped piston valve in sequence to finally open and close said main piston valve.

3. An electromagnetic pilot valve according to claim 2, wherein said main valve port, said pilot port, said auxiliary pilot ports, said cup-shaped piston valves and said plunger are all disposed in concentric relationship with each other in said valve housing.

4. An electromagnetic pilot valve according to claim 3, wherein two auxiliary pilot ports are disposed between said pilot port and said main valve port.

* * * * *